United States Patent
Hsu et al.

(10) Patent No.: US 7,925,373 B2
(45) Date of Patent: Apr. 12, 2011

(54) MACHINE TOOL AND CONTROL METHOD THEREOF

(75) Inventors: Wei-Ming Hsu, Taipei Hsien (TW); Jhy-Hau Chiu, Taipei Hsien (TW)

(73) Assignee: Foxnum Technology Co., Ltd., Tu-Cheng, New Taipei (TW)

( * ) Notice: Subject to any disclaimer, the term of this patent is extended or adjusted under 35 U.S.C. 154(b) by 277 days.

(21) Appl. No.: 12/262,187

(22) Filed: Oct. 31, 2008

(65) Prior Publication Data

US 2009/0265029 A1 Oct. 22, 2009

(30) Foreign Application Priority Data

Apr. 18, 2008 (TW) .............................. 97114134 A

(51) Int. Cl.
*G06F 19/00* (2006.01)
(52) U.S. Cl. ........................... 700/188; 700/69; 700/170
(58) Field of Classification Search .................... 700/69, 700/96, 159, 170, 186, 188
See application file for complete search history.

(56) References Cited

U.S. PATENT DOCUMENTS 4,603,286 A * 7/1986 Sakano ........................ 318/615

* cited by examiner

*Primary Examiner* — Kidest Bahta
*Assistant Examiner* — Nathan Laughlin
(74) *Attorney, Agent, or Firm* — Zhigang Ma

(57) ABSTRACT

An acceleration/deceleration control method of a CNC machine tool includes receiving an acceleration/deceleration timing signal and a velocity signal. The acceleration/deceleration timing signal is calculated to acquire a plurality of different first weight values and different second weight values by a first formula and a second formula. A velocity variation of the velocity signal is determined to be zero, positive or negative. The velocity signal is acquired, if the velocity variation is zero. A plurality of acceleration signals are acquired by the velocity signal multiplying each of the first weight values, if the velocity variable is positive. A plurality of deceleration signals are acquired by the velocity signal multiplying each of the second weight values, if the velocity variation is negative. The velocity signal, the acceleration signal and the deceleration signal are converted into a first driving signal, a second driving signal and a third driving signal.

16 Claims, 13 Drawing Sheets

MACHINE TOOL AND CONTROL METHOD THEREOF

BACKGROUND

1. Technical Field

The invention relates to machine tool control and, more particularly, to a computerized numerical control machine tool and an acceleration/deceleration control method thereof.

2. Description of Related Art

Machine tools have recently begun making use of computerized numerical control technology. The computerized numerical control (CNC) machine tool uses a CNC system to combine movement of the machine tool, and direct the machine tool to control movement of a workpiece. Current demands on the machine tool system include increased functionality, reduced volume of the computer and driving equipment, and improved accuracy of calculation. Promotion of acceleration/deceleration control technology is thus important.

Referring to FIG. 7, a CNC machine tool 1 includes an input unit 11, a transport unit 12, and a drive unit 13. The transport unit 12 is coupled between the input unit 11 and the drive unit 13. The input unit 11 receives a data signal D1 and converts it into a coding signal D2, a velocity signal, as shown in FIG. 8A. The transport unit 12 includes a first filter 121, a second filter 122 and a third filter 123, connected in series. The filters 121, 122, 123 have a plurality of weight values K0~K3n−1 and a plurality of registers R1~R9, as shown in FIG. 8B, with the weight values K0~K3n−1 fixed, and the number of registers R1~R9 and total weight values K0~K3n−1 corresponding to an acceleration/deceleration time T1 of the CNC machine tool 1.

The transport unit 12 using the first filter 121, the second filter 122, and the third filter 123, converts the coding signal D2 into a plurality of acceleration/deceleration signals D3, as shown in FIG. 8C. The drive unit 13 controls rotation speed and direction of a motor 14 of machine tool 1, according to each acceleration/deceleration signal D3.

As mentioned, in movement of the machine tool 1, a value of the coding signal D2 is set at 30 units, as shown in FIG. 8A, and the weight values K0~K3n−1 are set 1 unit, as shown in FIG. 8B. The filters 121, 122, 123 have three registers respectively, and acceleration/deceleration time T1 is set at 3 units.

Generally, for average movement of the acceleration/deceleration control, after the first filter 121 receives the coding signal D2, it calculates and totals the corresponding weight values K0~K3n−1 to acquire a first velocity signal V1 for acceleration/deceleration time unit, input into the second filter 122. The second filter 122 and the third filter 123 respectively receive first velocity signal V1 and second velocity signal V2 by the movement average method. Accordingly, the CNC machine tool 1 uses the movement average method three times to convert the coding signal D2 to the acceleration/deceleration signal D3, as shown in FIG. 8C.

However, in the movement average method, CNC machine tool 1 requires one pass to set the acceleration/deceleration time to T1, as shown in FIG. 9. Curves A, B, and C are velocity curves from 1st, 2nd, and 3rd passes of the movement average method, such that CNC machine tool 1 requires three full orders of acceleration/deceleration time T1 to achieve stability and is unable to change the shape of the velocity curves according to manufacturing conditions. As such, velocity curves utilizing the movement average method three times are resultingly clock-shaped curves, as shown in FIG. 8C and FIG. 9. In addition, the movement average method of the CNC machine tool 1 causes the motor to experience corner error, and a curve in the E portion to peak sharply, as shown in FIG. 10. Further, the acceleration distance of the motor 14 is too short to accelerate to a maximum speed, which generates a tracking error.

DETAILED DESCRIPTION

Figure 1:
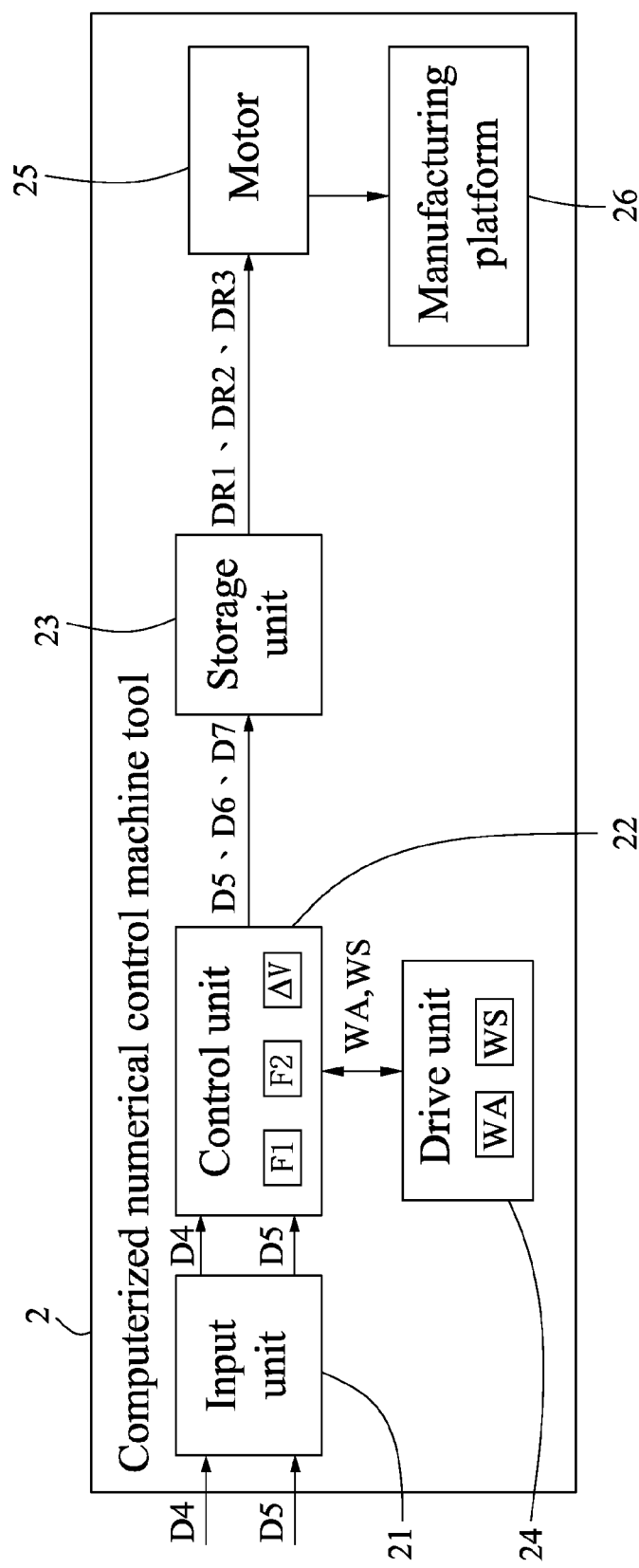
FIG. 1 is a block diagram of hardware structure of a computerized numerical control machine tool, in accordance with on embodiment.

Referring to FIG. 1, a computerized numerical control (CNC) machine tool 2 according to an embodiment of the disclosure is shown. The CNC machine tool 2 includes an input unit 21, a control unit 22, a storage unit 23, a drive unit 24, a motor 25 and a manufacturing platform 26.

Figure 2:
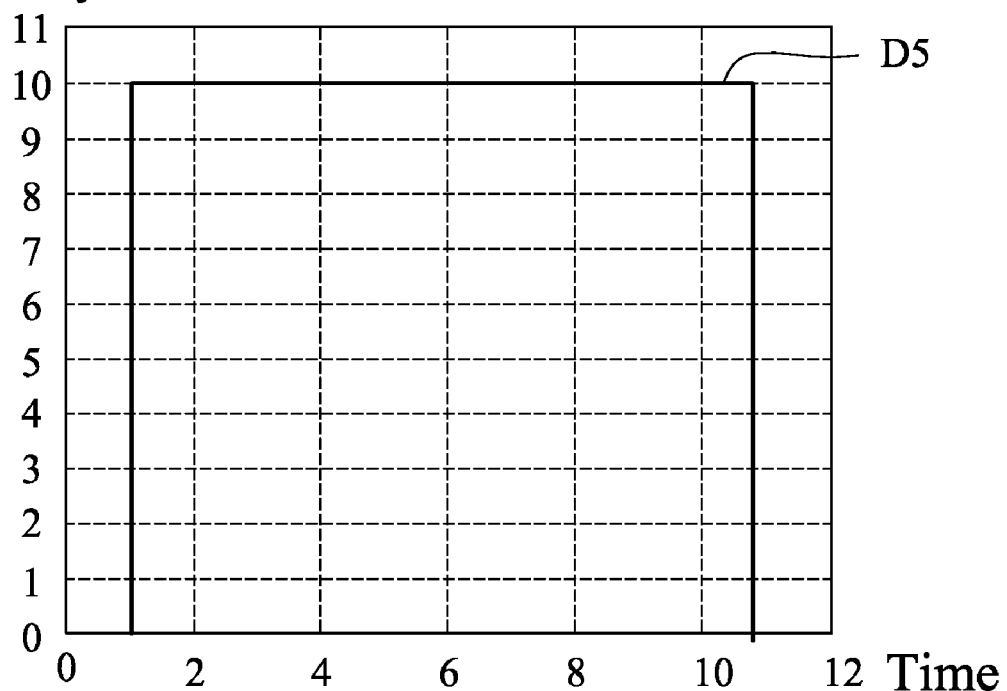
FIG. 2 shows an oscillogram of a velocity signal of the machine tool of FIG. 1.
Figure 3:
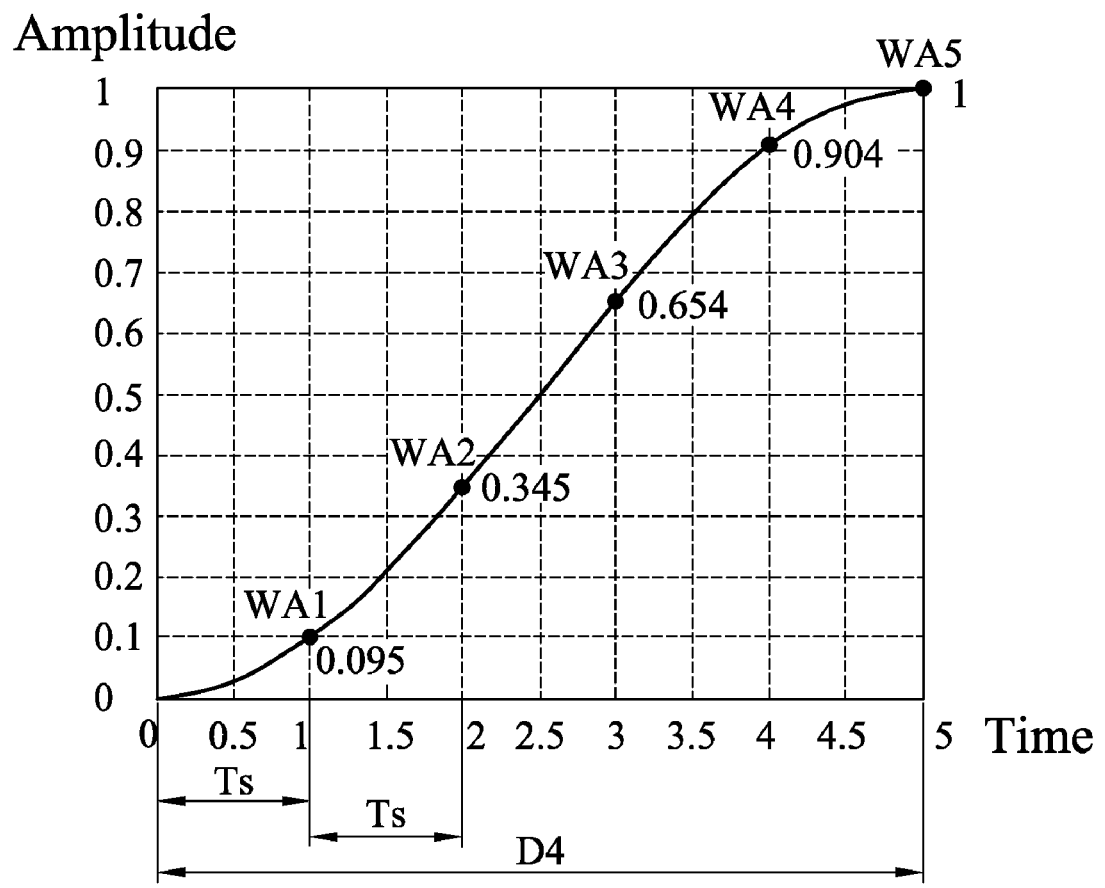
FIG. 3 shows an oscillogram of first weight values of the machine tool of FIG. 1.
Figure 4:
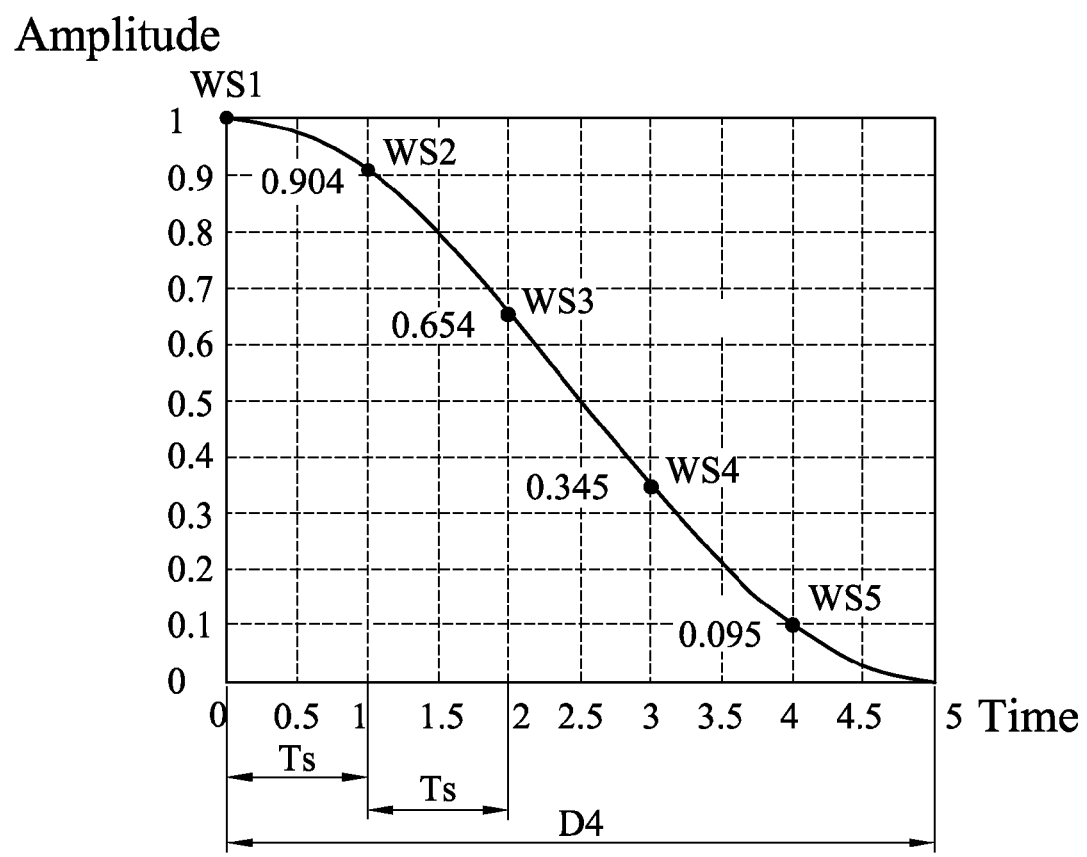
FIG. 4 shows an oscillogram of second weight values of the machine tool of FIG. 1.

The input unit 21 receives an acceleration/deceleration timing signal D4 followed by a velocity signal D5. The velocity signal D5 of in the embodiment of the disclosure is a tangent velocity, as shown in FIG. 2, and a value of the acceleration/deceleration timing signal D4 is a number of sampling times, as shown in FIG. 3 and FIG. 4. Values of the acceleration/deceleration timing signal D4 and the velocity D5 are preset, input to or predetermined within the CNC machine tool 2.

Referring to FIG. 1, FIG. 3 and FIG. 4, the control unit 22 with first formula F1 module and second formula F2 module couples with the input unit 21. The control unit 22 receives the acceleration/deceleration timing signal D4 and the velocity signal D5 through the input unit 21, and acquires a plurality of different first weight values WA by the acceleration/deceleration timing signal D4 being calculated through the first formula F1, as shown in FIG. 3. First formula F1 is:

$$f(w1) = 0.5\left[\sin\left(\theta 1 + \frac{3\pi}{2}\right) + 1\right]$$

where f(w1) is first weight value WA, θ1 is from 0 to π/2, and θ1 corresponds to a value of the acceleration/deceleration timing signal D4. A value of θ1 is separated from the range 0 to π/2 by a sampling time Ts, therefore the number of θ1 is the value of the acceleration/deceleration timing signal D4.

Control unit 22 also acquires a plurality of different second weight values WS by the acceleration/deceleration timing signal D4 being calculated through the second formula F2, as shown in FIG. 4. The second formula F2 is:

$$f(w2) = 0.5\left[\sin\left(\theta 2 + \frac{\pi}{2}\right) + 1\right]$$

where f(w2) is the second weight value WS, θ2 is from 0 to π/2, and a number of θ2 corresponds to a value of the acceleration/deceleration timing signal D4. A value of θ2 is separated from the range 0 to π/2 by a sampling time Ts, resulting in the number of θ2 showing as the value of the acceleration/deceleration timing signal D4. First formula F1 and second formula F2 are sine formulae, and both a number of the first weight values WA and of the second weight values WS are values of the acceleration/deceleration timing signal D4.

Furthermore, the control unit 22 determines whether a velocity variation ΔV of the velocity signal D5 is zero, positive or negative, the velocity variation ΔV being a difference between current velocity signal D5 and a preceding velocity signal D5.

If the velocity variation ΔV is zero, the control unit 22 outputs the velocity signal D5. If the velocity variation ΔV is positive, the control unit 22 acquires and outputs the acceleration signals D6 equal to the velocity signal D5 multiplying the first weight values WA. If the velocity variation ΔV is negative, the control unit 22 acquires and outputs the deceleration signals D7 by the velocity signal D5 multiplying the second weight values WS. The control unit 22 may be a programming control unit, a controller, a processor, a microprocessor, or a microchip. The acceleration signal D6 and the deceleration velocity signal D7 are velocity signals.

The storage unit 23, coupled to the control unit 22, stores the first weight values WA and the second weight values WS, and may be a memory or a register.

The drive unit 24, coupled to the control unit 22, receives the velocity signal D5, the acceleration signal D6, and the deceleration signal D7 for conversion to a first driving signal DR1, a second driving signal DR2, and a third driving signal DR3. The drive unit 24 is a position control and inputs/outputs (EPCIO) or position axis card. The first driving signal DR1, the second driving signal DR2, and the third driving signal DR3 are pulse values or voltage values.

The motor 25 couples with the manufacturing platform 26 and the drive unit 24. The drive unit 24 operates with the first driving signal DR1, the second driving signal DR2, and the third driving signal DR3 to control rotation speed and direction of the motor 25 which moves the manufacturing platform 26.

An exemplary operation of CNC machine tool 2 in FIG. 1 follows, wherein the velocity signal D5 and the acceleration/deceleration timing signal D4 are preset from outside.

When CNC machine tool 2 starts, the input unit 21 receives acceleration/deceleration timing signal D4 equally divided into the five sample times Ts to be sent to the control unit 22, as shown in FIG. 3 and FIG. 4. The control unit 22 acquires the five first weight values WA1, WA2, WA3, WA4, WA5, of 0.095, 0.345, 0.654, 0.904, and 1, by manipulating the acceleration/deceleration timing signal D4 through the first formula F1, as shown in FIG. 3. In addition, the control unit 22 acquires five second weight values WS1, WS2, WS3, WS4, WS5 of 1, 0.904, 0.654, 0.345, and 0.095, by manipulating the acceleration/deceleration timing signal D4 through the second formula F2, as shown in FIG. 4. Control unit 22 further stores the five first weight values WA1, WA2, WA3, WA4, and WA5, and the five second weight values WS1, WS2, WS3, WS4, and WS5 into the storage unit 23.

Figure 5:
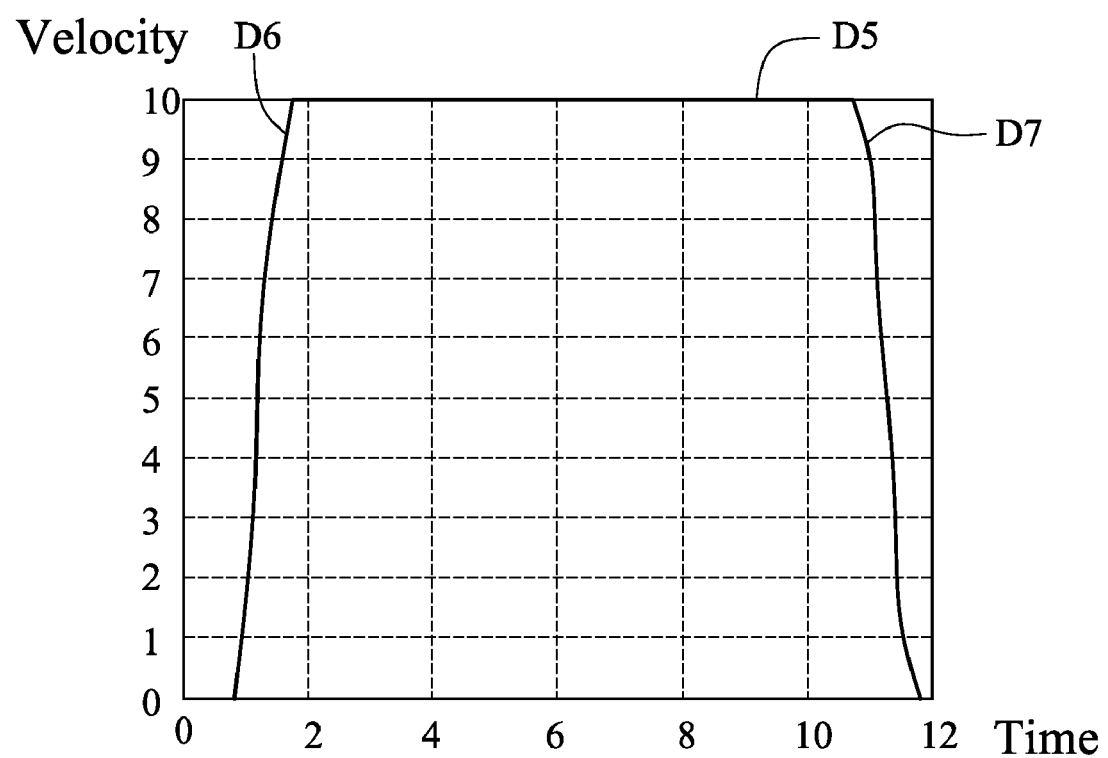
FIG. 5 shows an oscillogram of velocity, acceleration, and deceleration signals of the machine tool of FIG. 1, formed using an acceleration/deceleration control method in accordance with the embodiment.

The control unit 22 continues to determine whether the velocity signal D5 has the velocity variation ΔV. Referring to FIG. 2, at time 1, the input unit 21 starts to receive the velocity signal D5 which changes from 0 to 10 units. Accordingly, velocity variation ΔV is positive, and the control unit 22 acquires the five acceleration signals D6 of 0.9, 3.4, 6.5, 9, and 10 by the velocity signal D5 multiplying the five first weight values WA1, WA2, WA3, WA4, WA5, respectively, and transmits the acceleration signals to the drive unit 24, as shown in FIG. 5. The drive unit 24 converts the acceleration signals D6 to second driving signals DR2 to drive the motor 25 to move the manufacturing platform 26.

From times 1 to 11, the input unit 21 receives the velocity signals D5, 10 units in turn, as shown in FIG. 2. The velocity variations ΔV are zero, and the control unit 22 directly outputs the velocity signals D5 to the drive unit 24 for conversion to the first driving signals DR1 to drive the motor 25.

At time 11, the velocity signal D5 changes from 10 to 0 units, as shown in FIG. 2. The velocity variation ΔV is negative, and the control unit 22 acquires the five deceleration signals D7 of 10, 9, 6.5, 3.4, and 0.9 by the velocity signal D5 multiplying the five first weight values WA1, WA2, WA3, WA4, WA5, for transmission to the drive unit 24, as shown in FIG. 5. The drive unit 24 converts the five deceleration signals D7 to the third driving signals DR3 to drive the motor 25 to move the manufacturing platform 26. After time 11, the velocity signal D5 input to the input unit 21 stops.

Control unit 22 continues to determine the velocity variation ΔV until the CNC machine tool 2 stops.

Accordingly, the CNC machine tool 2 of the disclosure, using the first formula F1 and the second formula F2, only undergoes acceleration/deceleration once to achieve stability, rather than three times.

Figure 6A:
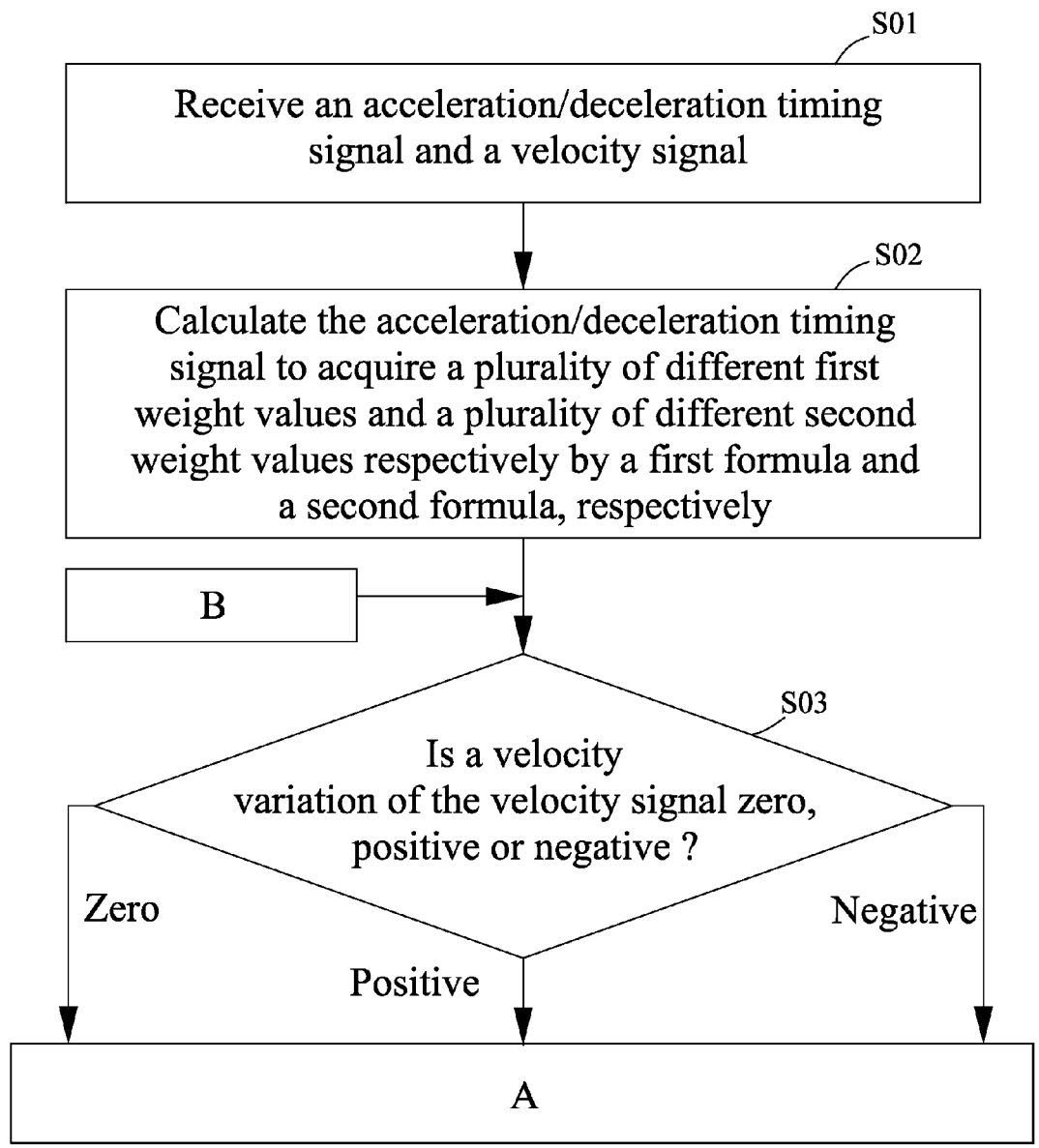
FIGS. 6A, 6B are flowcharts of an acceleration/deceleration control method for a computerized numerical control machine tool in accordance with an embodiment.
Figure 6B:
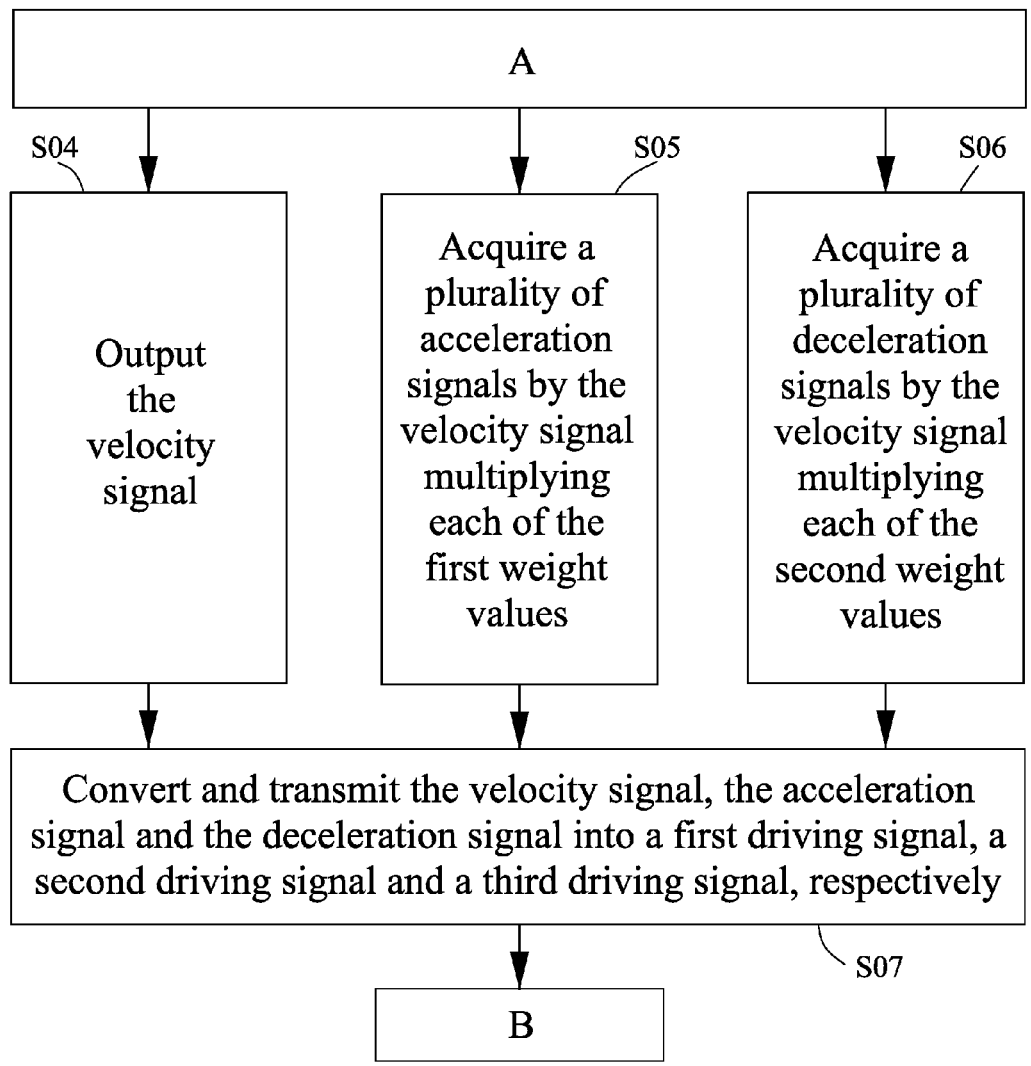
Figure 7:
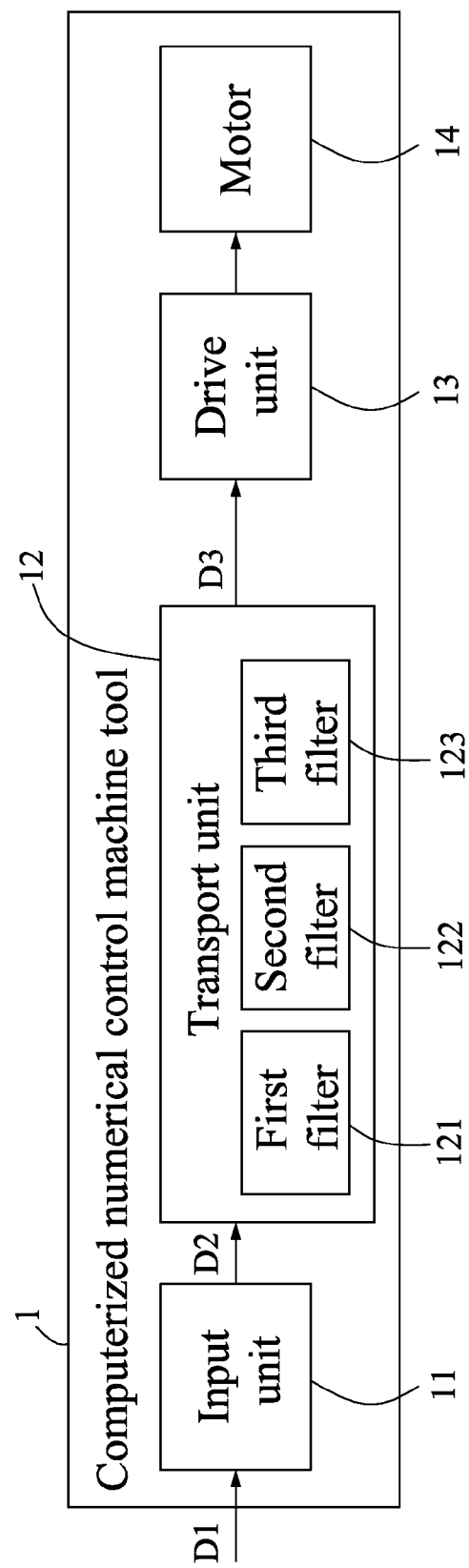
FIG. 7 is a block diagram of hardware structure of a related-art conventional computerized numerical control machine tool.
Figure 8A:
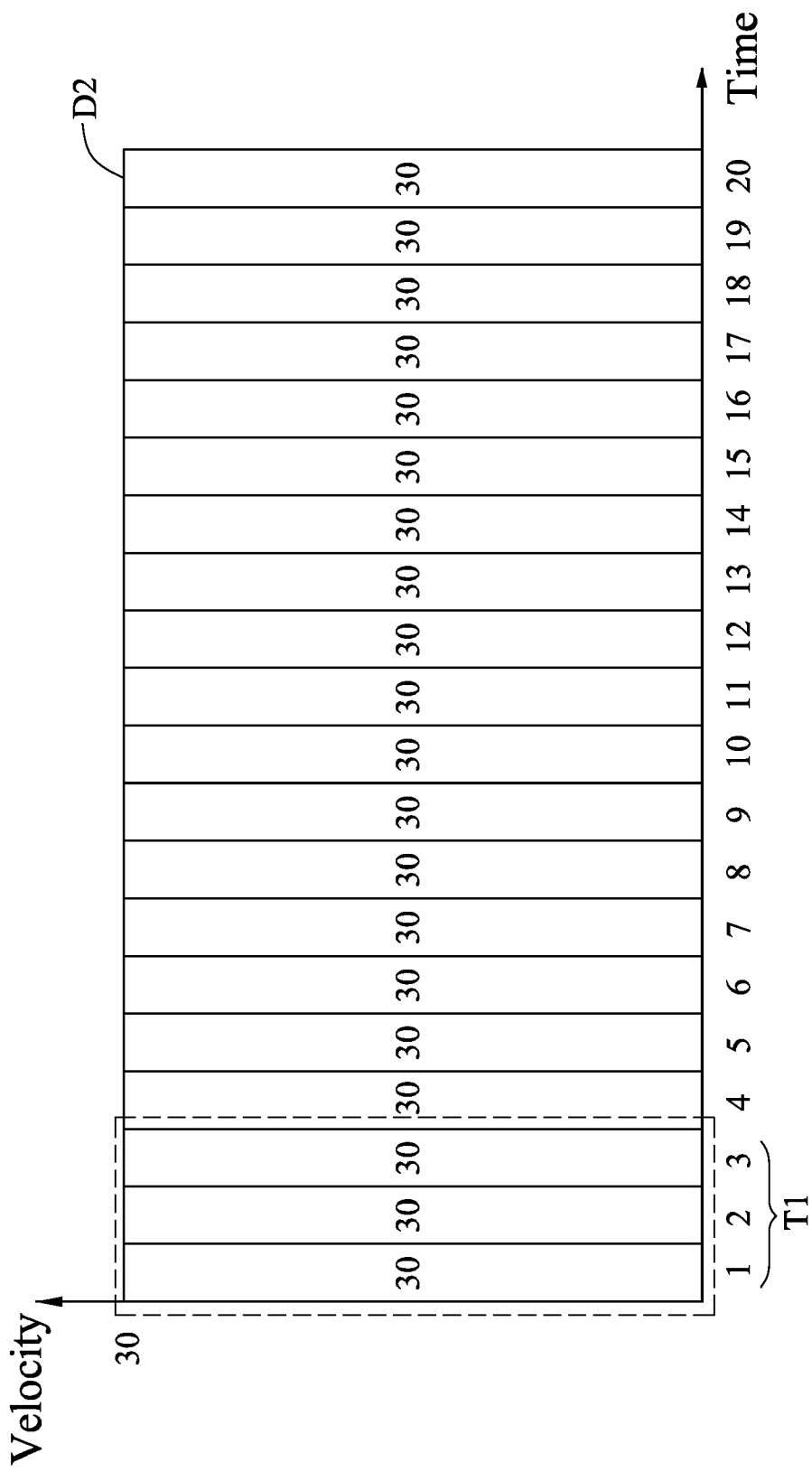
FIG. 8A shows an oscillogram of a velocity signal of the machine tool of FIG. 7.
Figure 8B:
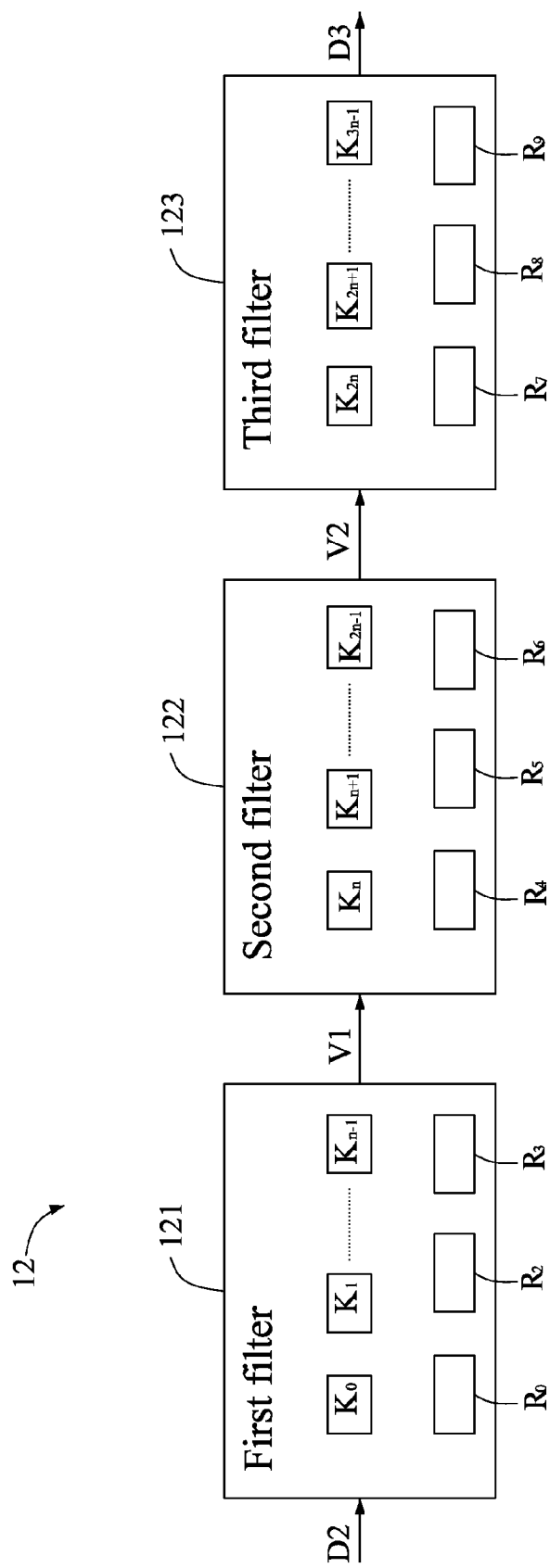
FIG. 8B is a block diagram of first, second, third filters of the machine tool of FIG. 7.
Figure 8C:
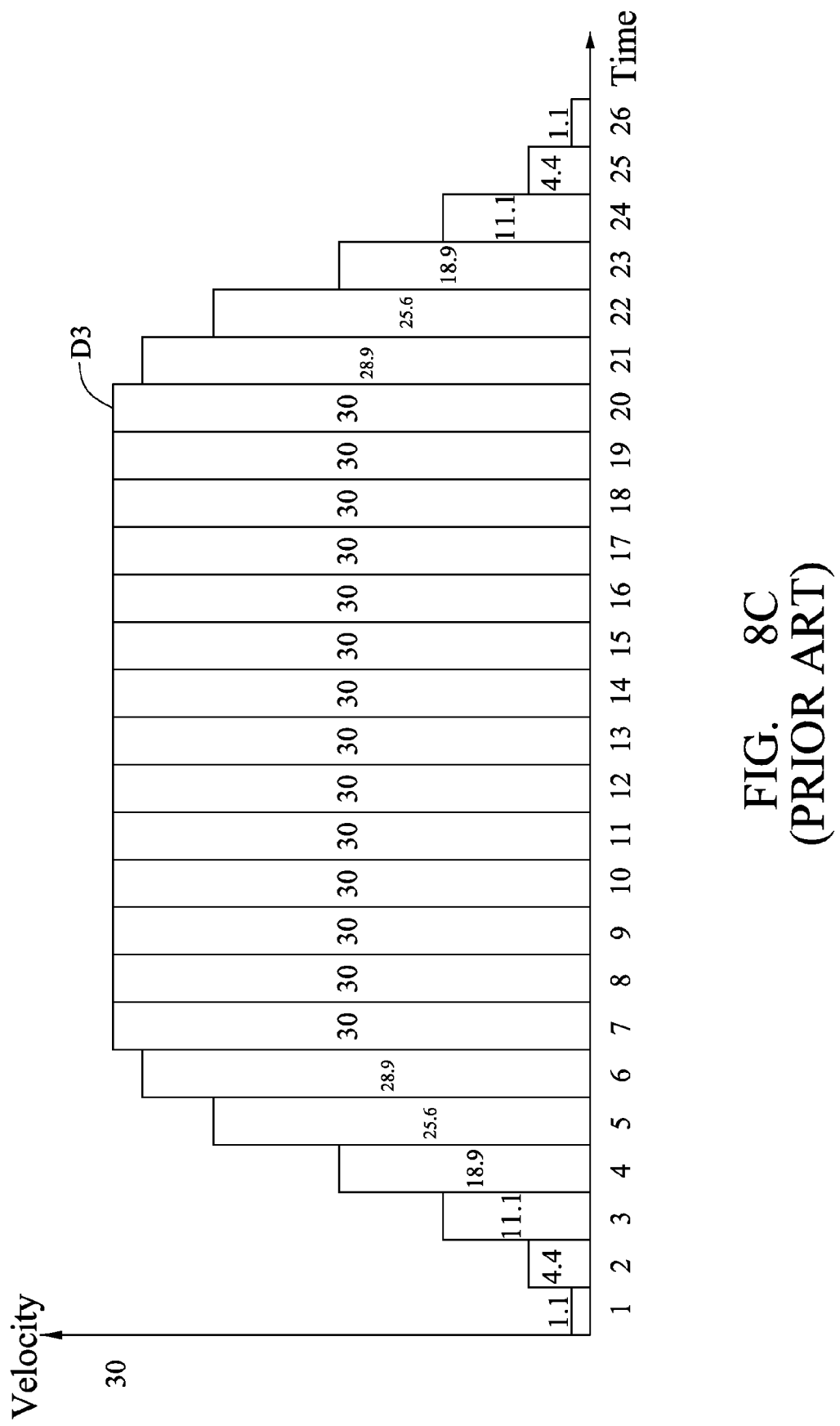
FIG. 8C shows an oscillogram of an acceleration signal of the machine tool of FIG. 7.
Figure 9:
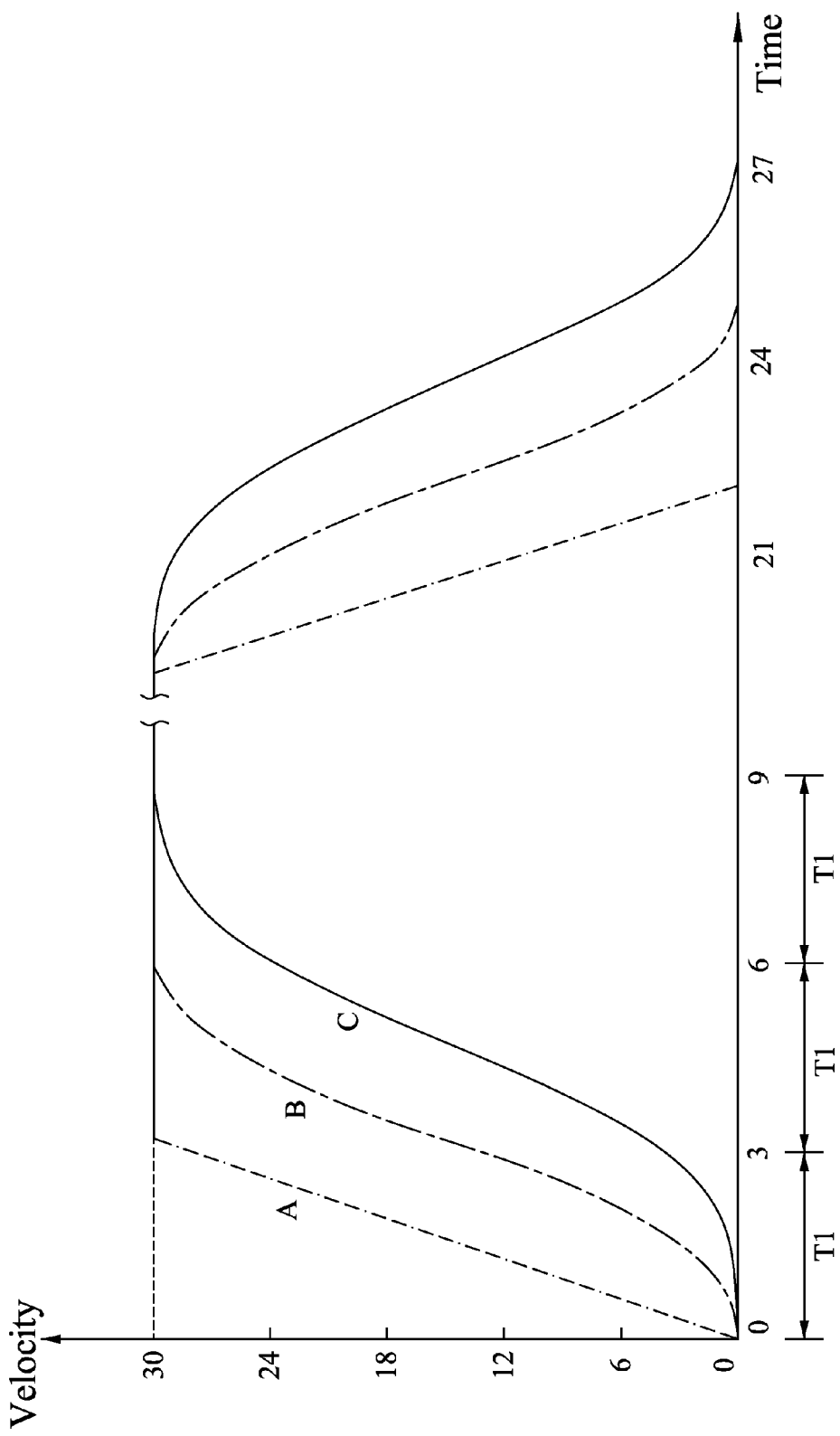
FIG. 9 is a diagram of a curve of a deceleration signal of the machine tool of FIG. 7.
Figure 10:
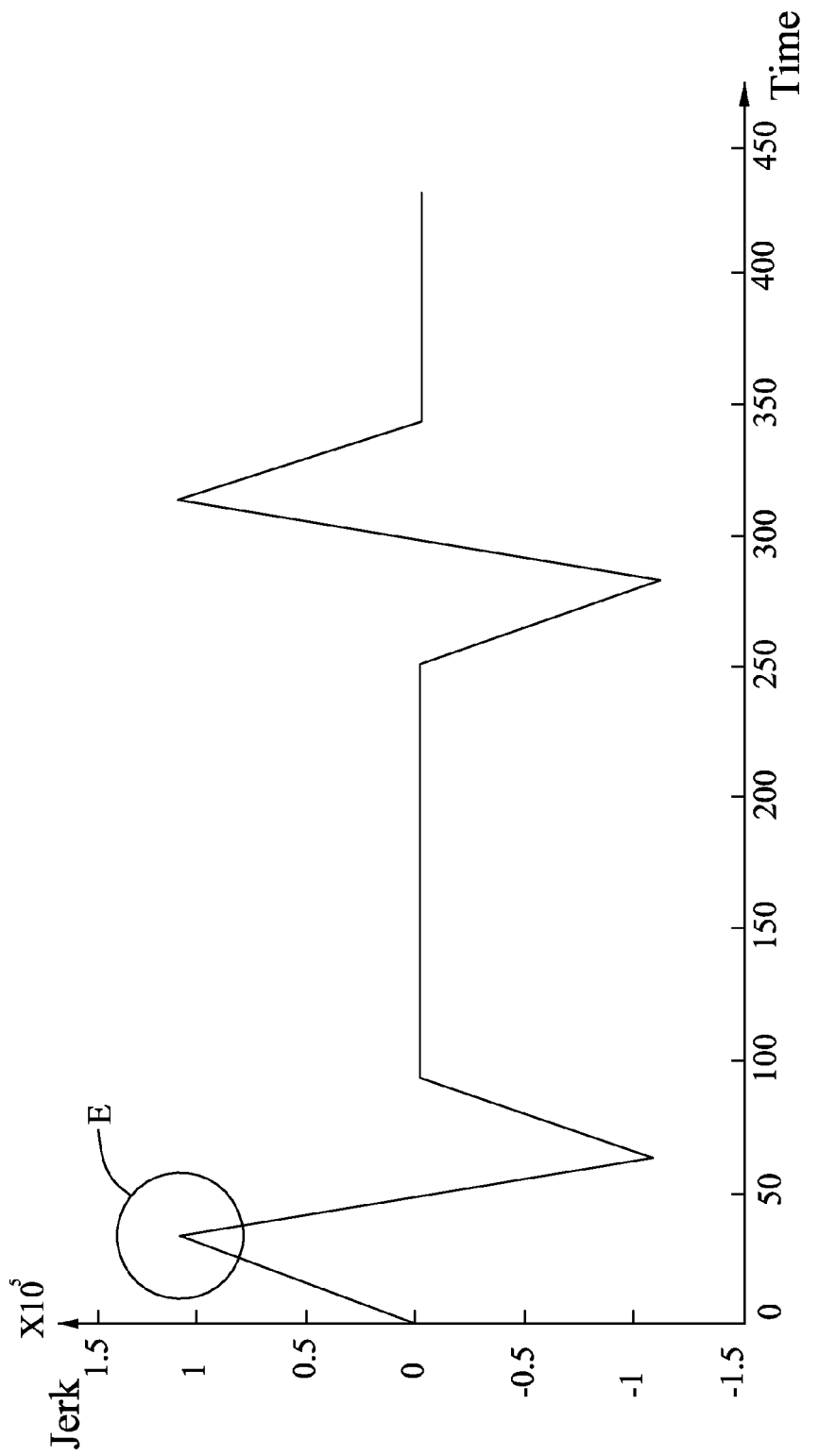
FIG. 10 is a diagram of a peaking curve of the machine tool of FIG. 7.

The acceleration/deceleration control method, in accordance with an embodiment, of the CNC machine tool 2, as shown in FIGS. 6A and 6B, includes the following steps starting with step S01, in step S01, the machine tool 2 receives acceleration/deceleration timing and velocity signals.

In step S02, the acceleration/deceleration timing signal is calculated to acquire a plurality of different first weight values and of different second weight values by a first formula and a second formula, respectively. The first formula F1 is:

$$f(w1) = 0.5\left[\sin\left(\theta 1 + \frac{3\pi}{2}\right) + 1\right]$$

where f(w1) is the first weight value, θ1 is from 0 to π/2, and the second formula F2 is:

$$f(w2) = 0.5\left[\sin\left(\theta 2 + \frac{\pi}{2}\right) + 1\right]$$

where f(w2) is the second weight value, θ2 is from 0 to π/2, θ2 and θ2 correspond to a value of the acceleration/deceleration timing signal.

In step S03, the CNC machine tool 2 determines whether a velocity variation of the velocity signal is zero, positive or negative, wherein the velocity variation is a difference between the velocity signal and a preceding velocity signal. Accordingly, the CNC machine tool 2 executes step S04, step S05 or step S06.

If the velocity variation is zero, step S04 is executed, in which the velocity signal is output.

If the velocity variation is positive, step S05 is executed, in which a plurality of additional velocity signals are acquired by the velocity signal multiplying each first weight value.

If the velocity variation is negative, step S06 is executed, in which a plurality of deceleration signals are acquired by the velocity signal multiplying each second weight value.

In step S07, the velocity signal, the acceleration signal and the deceleration signal are converted to a first driving signal, a second driving signal and a third driving signal, respectively. After step S07, the CNC machine tool 2 continues to execute step S03 until the CNC machine tool 2 stops circulation.

The disclosed CNC machine tool 2 and acceleration/deceleration control method thereof use only the first formula F1 and the second formula F2 to acquire a plurality of different first weight values WA and second weight values WS without requiring three movements using three filters and has the same fixed weight values. Thus, the effect of the single acceleration/deceleration control method is equivalent to that of the conventional three movement method. Furthermore, the first formula F1 and the second formulae F2, being sine formulae, prevent the sine curve experiencing a peak, and employment of the first and second formulae effectively controls the acceleration/deceleration timing signal, avoiding delays, improving product quality and precision of manufacture.

It is to be understood that the disclosure is intended to illustrate rather than limit the invention. Variations may be made to the embodiment of the disclosure without departing from the spirit of the invention as claimed.

What is claimed is:

1. An acceleration/deceleration control method of a computerized numerical control machine tool, the method comprising:
   receiving an acceleration/deceleration timing signal;
   receiving a velocity signal;
   calculating the acceleration/deceleration timing signal to acquire a plurality of different first weight values and a plurality of different second weight values respectively by a first formula and a second formula, respectively, wherein the first formula is:

$$f(w1) = 0.5\left[\sin\left(\theta 1 + \frac{3\pi}{2}\right) + 1\right]$$

where f(w1) is the first weight value, θ1 is from 0 to π/2, and the second formula is:

$$f(w2) = 0.5\left[\sin\left(\theta 2 + \frac{\pi}{2}\right) + 1\right]$$

where f(w2) is the second weight value, θ2 is from 0 to π/2, θ1 and θ2 correspond to a value of the acceleration/deceleration timing signal;
   determining whether a velocity variation of the velocity signal is zero, positive or negative, wherein the velocity variation is a difference between the velocity signal and a preceding velocity signal;
   if the velocity variation is zero, outputting the velocity signal;
   if the velocity variable is positive, acquiring a plurality of acceleration signals by the velocity signal multiplying each of the first weight values;
   if the velocity variation is negative, acquiring a plurality of deceleration signals by the velocity signal multiplying each of the second weight values; and
   converting and transmitting the velocity signal, the acceleration signal and the deceleration signal into a first driving signal, a second driving signal and a third driving signal, respectively.

2. The method as claimed in claim 1, wherein after transmitting the first driving signal, the second driving signal and the third driving signal, if the computerized numerical control machine tool continues working, the determining step is repeated.

3. The method as claimed in claim 1, wherein the velocity signal is a tangent velocity signal.

4. The method as claimed in claim 1, wherein the value of the acceleration/deceleration timing signal is a number of sampling times.

5. The method as claimed in claim 1, wherein the acceleration signal and the deceleration signal are velocity signals.

6. The method as claimed in claim 1, wherein the first driving signal, the second driving signal and the third driving signal are pulse values or voltage values.

7. A computerized numerical control machine tool, comprising:
   an input unit capable of receiving and transmitting an acceleration/deceleration timing signal and a velocity signal;
   a control unit coupled with the input unit and comprising a first formula module and a second formula module, the two formula modules being capable of calculating the acceleration/deceleration timing signal to acquire a plurality of different first weight values and a plurality of different second weight values by the first formula and the second formula, acquiring a plurality of acceleration signals by the velocity signal multiplying the first weight values, and acquiring a plurality of deceleration signals by the velocity signal multiplying the second weight values, the control unit being further capable of determining whether velocity variation of the velocity signal is zero, positive or negative, wherein the velocity variation is a difference between the present velocity signal and the preceding velocity signal, where the first formula is:

$$f(w1) = 0.5\left[\sin\left(\theta 1 + \frac{3\pi}{2}\right) + 1\right]$$

where f(w1) is the first weight value, θ1 is from 0 to π/2, and the second formula is:

$$f(w2) = 0.5\left[\sin\left(\theta 2 + \frac{\pi}{2}\right)1\right]$$

where f(w2) is the second weight value, θ2 is from 0 to π/2, and a θ1 and θ2 respectively correspond to a value of the acceleration/deceleration timing signal;

a drive unit coupled with the control unit and capable of converting the velocity signal, a acceleration signal and a deceleration signal to a first driving signal, a second driving signal and a third driving signal; and a motor coupled with the drive unit, the drive unit according to the first driving signal, the second driving signal and the third driving signal being capable of controlling a direction and a rotation speed of the motor.

8. The computerized numerical control machine tool as claimed in claim 7, wherein the velocity signal is a tangent velocity signal.

9. The computerized numerical control machine tool as claimed in claim 7, wherein the acceleration signal and the deceleration signal are velocity signals.

10. The computerized numerical control machine tool as claimed in claim 7, wherein the value of the acceleration/deceleration timing signal is a number of sampling times.

11. The computerized numerical control machine tool as claimed in claim 7, wherein the control unit is a controller, a processor, a microprocessor or a micro-processing chip.

12. The computerized numerical control machine tool as claimed in claim 7, further comprising a storage unit coupled with the control unit and capable of storing the first weight values and the second weight values.

13. The computerized numerical control machine tool as claimed in claim 12, wherein the storage unit is a memory or a register.

14. The computerized numerical control machine tool as claimed in claim 7, wherein the first driving signal, the second driving signal and the third driving signal are pulse values or voltage values.

15. The computerized numerical control machine tool as claimed in claim 7, wherein the drive unit is a position control and inputs/outputs or a position axis card.

16. The computerized numerical control machine tool as claimed in claim 7, further comprising a manufacturing platform coupled with the motor, wherein the drive unit is capable of driving the motor to move the manufacturing platform.

* * * * *